UNITED STATES PATENT OFFICE.

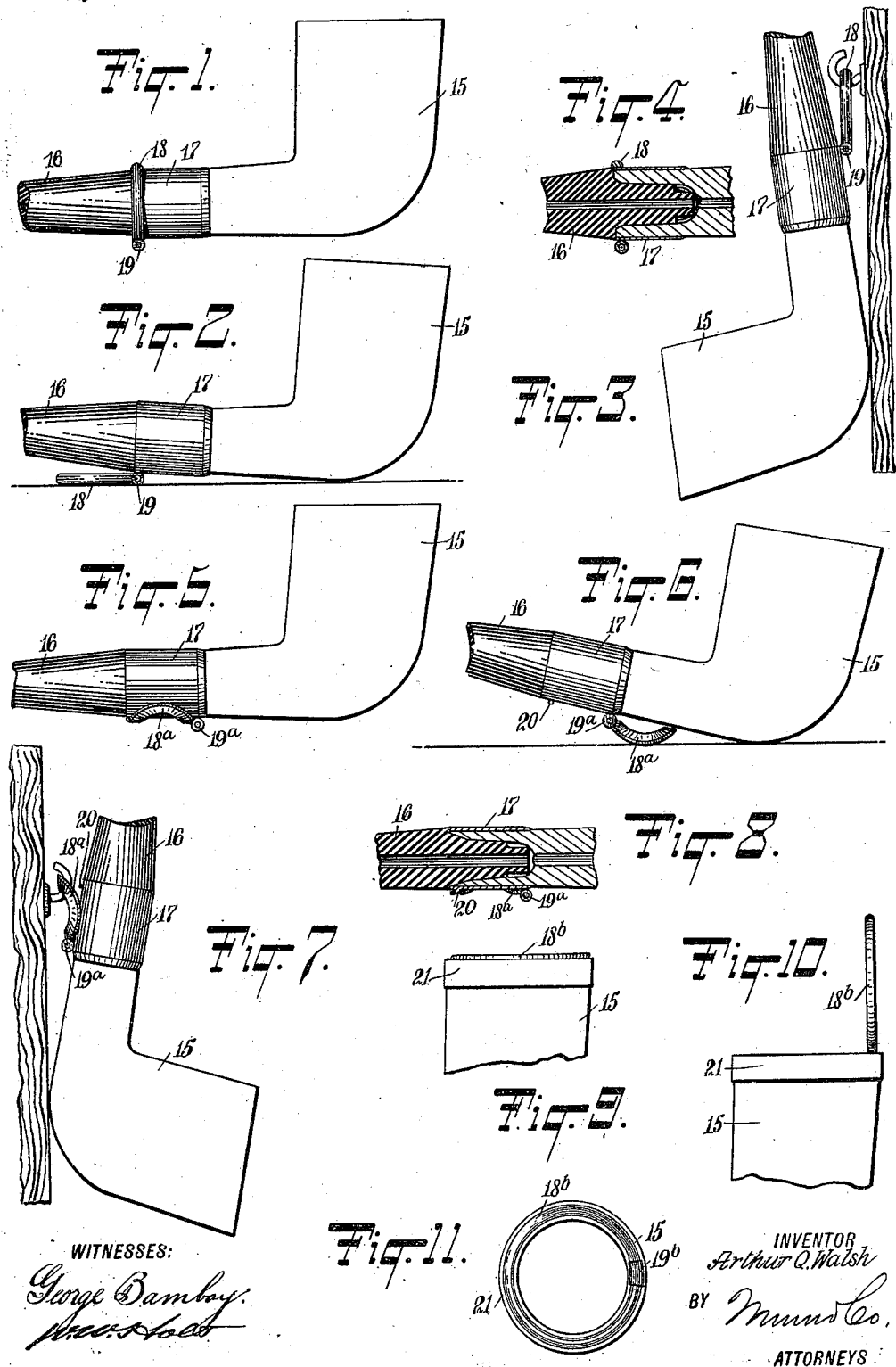

ARTHUR Q. WALSH, OF NEW YORK, N. Y.

TOBACCO-PIPE.

977,910.  Specification of Letters Patent.  Patented Dec. 6, 1910.

Application filed February 26, 1910. Serial No. 546,052.

*To all whom it may concern:*

Be it known that I, ARTHUR Q. WALSH, a citizen of Great Britain, and a resident of the city of New York, borough of Manhattan, in the county and State of New York, have invented a new and Improved Tobacco-Pipe, of which the following is a full, clear, and exact description.

Tobacco pipes as ordinarily constructed are neither adapted to be stably seated in a position to prevent the tobacco or ashes from spilling, nor suspended on a pipe rack. Pipes have, however, been made with a flattened base in order that the pipe bowl may stand upright when the pipe is temporarily laid on a table or other surface. Pipes of this shape are not to the liking of some smokers, and it is the object of the present invention to adapt the pipe to be either suspended or seated with the bowl upright, without requiring the bowl to be made of any special shape. To this end I provide the pipe with a suspending and supporting device or ring, which is hinged to swing into a convenient position for use and is adapted to fold against and conform to the pipe and form a portion of the pipe trimming when it is to be disposed inoperatively.

Reference is to be had to the accompanying drawings forming a part of this specification, in which similar characters of reference indicate corresponding parts in all the views.

Figure 1 is a side view of a pipe, with the outer portion of the stem broken away, showing a form of my invention with the suspending ring folded over the outer end of the stem portion of the pipe bowl and covering the joint between this portion of the stem and the stem proper. Fig. 2 is a similar view, with the suspending ring moved to a position to serve as a seating base to hold the pipe bowl in an upright position; Fig. 3 is a similar view of the pipe with the ring suspending the pipe from a pipe rack; Fig. 4 is a fragmentary longitudinal section through the pipe stem and stem portion of the pipe bowl, showing the suspending ring in folded position; Fig. 5 is a view of the pipe similar to Fig. 1, showing a modified form of the suspending ring in folded position; Fig. 6 is a view of the pipe shown in Fig. 5, with the ring swung to a position to support the pipe bowl upright; Fig. 7 is a view of the pipe shown in Fig. 5, with the ring suspending the pipe from a hook of a pipe rack; Fig. 8 is a fragmentary longitudinal section through the pipe stem and stem portion of the bowl, showing the suspending and supporting ring folded flat against the pipe; Fig. 9 is a view of the upper portion of a pipe bowl, illustrating a still further form of the invention; Fig. 10 is a similar view with the suspending ring swung to a position for hanging the pipe; and Fig. 11 is a plan of the pipe bowl shown in Fig. 9, with the suspending ring in its inoperative position.

For the purpose of illustrating the nature and application of my improvements, I have shown a pipe comprising a conventional form of pipe bowl 15 and a stem 16, the stem removably fitting within the stem portion of the bowl in any suitable way, as is the customary practice, and, if desired, the stem portion of the bowl having suitable trimmings, such as the metal band 17, at its outer end.

In that form of my invention illustrated in Figs. 1 to 4 inclusive, a suspending or supporting ring 18 is of a diameter to neatly fit over the outer end of the bowl portion of the pipe stem and is hinged adjacent to the outer edge of the band 17, the hinge 19 being located at the bottom and extending horizontally when the pipe bowl is standing upright. The band 18 when folded against and conforming to the pipe, as shown in Fig. 1, covers the joint between the pipe stem and stem portion of the bowl, giving the construction a neat finish, and also affords a rib or shoulder by which a firm purchase may be had on the pipe with the fingers. By removing the stem 16, the ring 18 may be swung to the lower side of the stem, as illustrated in Figs. 2 and 3, in which position it serves either as a supporting base to retain the bowl of the pipe in an upright position when the pipe is seated on a surface, or for suspending the pipe from the hook of a pipe rack. By reason of the arrangement of the hinge 19, the hinge itself offers a supporting base to prevent the pipe from tilting when the ring is in its folded inoperative position, although obviously not so effective as when the ring is turned outwardly, as shown in Fig. 2.

In the form of the invention illustrated in Figs. 5 to 8 inclusive, the suspending and supporting ring $18^a$, corresponding to the ring 18 in the form of the invention just described, is connected to the under side of the band 17 by a hinge 19ª, which is arranged horizontally and transversely of the pipe similar to the hinge 19, and adapts the ring to be folded flat against the under side of the band and form a part of the trimming when the ring is not in use, as shown in Fig. 5, or be turned outwardly, as shown in Fig. 6, to afford a supporting base for suspending the pipe bowl in an upright position, the ring when moved outwardly from the band only slightly, being adapted to suspend the pipe from a rack, as illustrated in Fig. 7. The free end of the ring 18ª is preferably provided with an aperture which engages over a projection 20 extending from the band 17, by which the ring is firmly held in its inoperative position.

In the form of the invention shown in Figs. 9, 10, and 11, the bowl 15 of the pipe has a band 21, covering its upper edge, the band having an annular depression in the top adapted to receive a suspending ring 18ᵇ, the ring being received in a hinged member 19ᵇ formed in the band, the same adapting the ring to be swung out, as shown in Fig. 10, to either suspend the pipe or engage an adjacent object when the pipe is seated on a surface, and prevent the bowl from dropping to one side.

Having thus described my invention, I claim as new and desire to secure by Letters Patent:

1. A tobacco pipe having a suspending ring curved to lie smooth against a rounded portion of the pipe and conform to the shape thereof, and having a hinge adapting it to be swung outwardly from and against the pipe respectively to operative and inoperative position.

2. A tobacco pipe having a stem portion, a suspending device, and a hinge connecting the suspending device to the stem portion of the pipe and adapting the said device to fold against the stem portion of the pipe and swing outwardly therefrom to an operative position, the suspending device being shaped to conform to the shape of the stem portion of the pipe when the said device is in its folded position, and the hinge arranged to retain the pipe in an upright position when the pipe is seated on a flat surface.

3. A tobacco pipe having a stem, and a suspending ring hinged to the stem to swing to and from a position encircling the stem.

In testimony whereof I have signed my name to this specification in the presence of two subscribing witnesses.

ARTHUR Q. WALSH.

Witnesses:
ARTHUR HOWARD,
STUART P. HUBLEY.